United States Patent [19]
Korall et al.

[11] Patent Number: 5,487,955
[45] Date of Patent: *Jan. 30, 1996

[54] COOLED ZINC-OXYGEN BATTERY

[75] Inventors: Menachem Korall; Yehuda Harats; Boris Dechovich; Jonathan R. Goldstein, all of Jerusalem; Binyamin Koretz, Efrat, all of Israel

[73] Assignee: Electric Fuel (E.F.L.) Ltd., Jerusalem, Israel

[*] Notice: The term of this patent shall not extend beyond the expiration date of Pat. No. 5,366,822.

[21] Appl. No.: 387,277

[22] Filed: Feb. 13, 1995

Related U.S. Application Data

[63] Continuation-in-part of Ser. No. 286,539, Aug. 5, 1994, Pat. No. 5,445,901, which is a continuation-in-part of Ser. No. 213,674, Mar. 15, 1994, Pat. No. 5,366,822.

[51] Int. Cl.$^6$ .................. H01M 10/50; H01M 12/06
[52] U.S. Cl. ................. 429/26; 429/27; 429/72; 429/113; 429/120
[58] Field of Search .............. 429/27, 26, 34, 429/62, 72, 149, 110, 113, 118, 120

[56] References Cited

U.S. PATENT DOCUMENTS

| | | | |
|---|---|---|---|
| 4,620,111 | 10/1986 | McArthur et al. | 429/27 X |
| 4,640,874 | 2/1987 | Kelm | 429/27 |
| 5,242,763 | 9/1993 | Konishi et al. | 429/27 |
| 5,366,822 | 11/1994 | Korall et al. | 429/27 |

*Primary Examiner*—Anthony Skapars
*Attorney, Agent, or Firm*—Helfgott & Karas

[57] ABSTRACT

The invention provides a multi-cell, sealed, cooled, zinc-oxygen battery, comprising a container containing a plurality of bi-cells, each cell having a housing provided with two major surfaces and accommodating a pair of oppositely-disposed, spaced-apart, air-permeable, liquid-impermeable cathodes in the form of oxygen-reduction electrodes, and defining between themselves a cavity configured to accommodate an anode of the battery and electrolyte, substantial portions of the major surfaces of the housing being removed, thus exposing major portions of the oxygen-reduction electrodes, and wherein two major surfaces are partly recessed in such a way as to form, in conjunction with a similarly-recessed outer surface of a major wall of an adjacent cell housing, an inter-cathode gas space between adjacent cells with a plurality of oxygen access openings leading thereto; an anode positioned within the cavity and comprising an active zinc anode component compacted into a rigid static bed of active anode material of tight interparticulate structure, the anode being provided with at least one internal fluid-carrying passage with inlet and outlet means, for circulating cooling fluid therethrough; a dead space volume between inner surfaces of the housing and the plurality of bi-cells; and pressurized oxygen supply means for feeding oxygen to the dead space volume, for consumption in the inter-cathode gas spaces.

17 Claims, 4 Drawing Sheets

COOLED ZINC-OXYGEN BATTERY

The present application is a continuation-in-part of U.S. patent application Ser. No. 08/286,539, filed Aug. 5, 1994, now U.S. Pat. No. 5,445,901, which in turn is a continuation-in-part of U.S. patent application Ser. No. 08/213,674, filed Mar. 15, 1994.

The present invention relates to a cooled zinc-oxygen battery.

More particularly, the invention provides a multi-cell, cooled, sealed, zinc-oxygen battery especially for use in electrically-powered sea craft such as submarines, surface ships and torpedoes. Other uses include vehicular and stationary applications and spacecraft.

U.S. patent application Ser. No. 08/213,674 relates to a modular cell for a multi-cell, metal-air battery system, and more particularly to such a system for use in electrically-powered vehicles; U.S. patent application Ser. No. 08/286,539 relates to a zinc-oxygen battery, as does the present invention.

All electric batteries generate heat during operation, one source of said heat being the chemical reaction taking place in the cells, and the second source being the current flow meeting the ohmic resistance of the battery itself. In most batteries, such heat is dissipated naturally, mainly by convection. However, batteries intended to power a totally-enclosed unit, such as a torpedo, are designed to provide high power from a compact battery envelope; due to the unavailability of natural convection cooling, they may exhibit a high temperature rise if no additional provision is made for cooling.

While a high operating temperature is not necessarily detrimental to battery performance, there are several reasons justifying some cooling arrangement in a battery of this type. First, in a naturally-cooled battery, the inner cells will operate at a considerably higher temperature than those on the battery perimeter, leading to operating differentials between the cells. Second, extreme battery heating may cause deformation of its plastic components.

Cooling systems for electric batteries are described in U.S. Pat. Nos. 754,969; 3,767,468; 4,007,315; 4,463,064; 4,578,324 and 5,212,024. These patents disclose various systems for circulating a cooling gas such as air, or a liquid such as water, through the battery to remove heat therefrom.

U.S. Pat. No. 4,925,744 describes and claims an aluminium-air battery, provided with means for admitting additional electrolyte into the cell from a reservoir positioned above the cell. Provision is made for extending the aluminium anode plate beyond one side of the cell for cooling by natural or forced convection. As hot gases rise, any hot article can best be air cooled by extracting heat from an upper surface. However, in U.S. Pat. No. 4,925,744 this is not feasible, as the upper surface of the cell is occupied by the reservoir. Consequently, heat has to be removed in a less-effective manner, by means of a provided side extension.

Metal-air batteries contain an electrolyte in liquid form, and such batteries can be cooled by circulating this electrolyte through some form of cooling system. Systems cooling the electrolyte are described in U.S. Pat. Nos. 3,290,176 and 5,093,213. Each system has its advantages when related to its particular application.

None of the above-mentioned patents relates to the problem of removing heat from the large area, thin anode found in the type of zinc-air battery used for vehicle propulsion, in particular those used to propel torpedoes.

A use for the technology developed for electrically-powered vehicles is in sea craft propulsion. There are problems inherent in such use, as described, e.g., in U.S. Pat. No. 4,341,847.

Zinc-oxygen cells have been used in batteries for electric vehicles and the like because they provide high energy density relative to other cell chemistries, and therefore high capacity. Zinc-oxygen cells may be recharged by mechanically replacing the zinc electrode, by replacing the liquid electrolyte which contains zinc particles, or by electrochemically replenishing zinc to the anode, while also making available a fresh oxygen supply.

Many zinc-oxygen cells have a solid planar zinc anode and an oxygen cathode, separated by a liquid electrolyte. Other zinc-oxygen cells have anode active zinc particles dispersed in the electrolyte and an inert anode current collector. When an external electrical load is connected to the electrodes, current flows through the circuit of the cell and load due to chemical reactions which take place at the electrode surfaces.

Prior zinc-oxygen cells have not been as stable as desired, due in part to the zinc anode surface becoming uneven in operation, in both the discharge and the electrochemical charge modes. Further, zincate ions formed in the electrolyte may decrease the electrocatalytic activity of the electrocatalytically active gas-electrolyte-electrode reaction sites. It is important to retain as many as possible electrocatalytically active gas-electrolyte-catalyst reactions sites readily available to each of the three phases of reaction participants.

U.S. Pat. No. 4,009,320 teaches an air-zinc battery having air passages through an active carbon cathode which is surrounded by a gelled electrolyte. U.S. Pat. No. 4,137,371 describes a zinc-oxygen cell having a zinc electrode, and an oxygen porous diffusion cathode with a zincate ion diffusion restricting membrane joined directly to the oxygen electrode between the porous layer of this electrode and the zinc electrode. This is stated to prevent poisoning of the electrochemically-active material by zincate ions. Flowing electrolytes containing anode active metal, such as zinc, in zinc-oxygen cells, are described in U.S. Pat. No. 4,136,232. Problems of such cells connected in series are pointed out in that patent.

In U.S. Pat. No. 4,341,847 there is suggested an electrochemical zinc-oxygen cell having concentric electrodes and a flowing electrolyte in the annular space therebetween, providing slurry and electrochemical recharging in the same cell; however, such an arrangement is simply not practical in the limited spaces provided for such batteries, e.g., in torpedoes.

It is therefore desirable to modify a stack of modular cells of the type described in U.S. patent application Ser. No. 08/212,674 for such uses.

It is one of the objects of the present invention to provide a compact, multi-cell battery which can be used in a sealed vehicle and which can yet be effectively cooled.

Thus, according to the present invention there is provided a multi-cell, sealed, cooled, zinc-oxygen battery, comprising a container containing a plurality of bi-cells, each cell having a housing provided with two major surfaces and accommodating a pair of oppositely-disposed, spaced-apart, air-permeable, liquid-impermeable cathodes in the form of oxygen-reduction electrodes and defining between themselves a cavity configured to accommodate an anode of said battery and electrolyte, substantial portions of the major surfaces of said housing being removed, thus exposing major portions of said oxygen electrodes; and wherein two major surfaces are partly recessed in such a way as to form, in conjunction with a similarly-recessed outer surface of a major wall of an adjacent cell housing, an inter-cathode gas space between adjacent cells with a plurality of oxygen access openings leading thereto; an anode positioned within said cavity and comprising an active zinc anode component compacted into a rigid static bed of active anode material of tight interparticulate structure, said anode being provided with at least one internal fluid-carrying passage with inlet and outlet means, for circulating cooling fluid therethrough; a dead space volume between inner surfaces of said housing and said plurality of bi-cells; and pressurized oxygen supply means for feeding oxygen to said dead space volume, for consumption in said inter-cathode gas spaces.

It has now been found that the anode skeletal frame can be used, wholly or in part, not only as a current collector as in our previous patent applications, but also as a cooling coil which removes heat from the anode forming the centre of each cell.

In preferred embodiments of the present invention, the skeletal frame includes a meandering tube forming said fluid-carrying passage. The fluid-carrying passage is formed of an electrically-conductive metal, and the cooling fluid is a non-electrically-conductive fluid, such as a halogenated hydrocarbon.

In a preferred embodiment of the present invention which is useful in applications such as torpedo propulsion, there is provided a multi-cell, sealed, zinc-oxygen battery wherein said battery is a deferred-action battery and said container further comprises an electrolyte storage vessel and an openable liquid flow path leading from said vessel to said cavity, for activation of said battery.

Furthermore, for this particular use, there is provided a multi-cell, sealed, zinc-oxygen battery as defined herein, in combination with a torpedo and wherein, during operation of said battery, said cooling fluid is circulated via pump means in heat exchange via an outer casing of said torpedo with a body of water in which said torpedo is propelled, to effect the cooling of said cooling fluid before recirculation thereof within the battery anode.

While in previously-mentioned embodiments of the invention the cooling coil is embedded in the cell anode, a further form of construction is described herein, which allows the use of a larger-diameter tube wherein a pair of anodes are separated by a cooling element. A cooling element formed from corrugated sheet material will described further below.

Thus, the invention provides a multi-cell, sealed, zinc-oxygen battery, comprising a container containing a plurality of adjacent pairs of mono cells, each pair of mono cells forming a unit contained in a simple housing provided with two major surfaces and accommodating a pair of oppositely-disposed, spaced-apart, air-permeable, liquid-impermeable cathodes in the form of oxygen-reduction electrodes, and defining between themselves a cavity configured to accommodate two anodes separated from each other by a cooling conduit, substantial portions of the major surfaces of said housing being removed, thus exposing major portions of said oxygen electrodes; and wherein said two major surfaces are partly recessed in such a way as to form, in conjunction with a similarly-recessed outer surface of a major wall of an adjacent cell housing, an inter-cathode gas space between adjacent cells with a plurality of oxygen access openings leading thereto; two anodes positioned within said cavity and separated from each other by a cooling conduit, each of said anodes comprising an active zinc anode component compacted into a rigid static bed of active anode material of tight interparticulate structure, said conduit being provided with at least one fluid-carrying passage with inlet and outlet means, for circulating cooling fluid between said adjacent anodes; a dead space volume between inner surfaces of said housing and said plurality of hi-cells; and pressurized oxygen supply means for feeding oxygen to said dead space volume, for consumption in said inter-cathode gas spaces.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
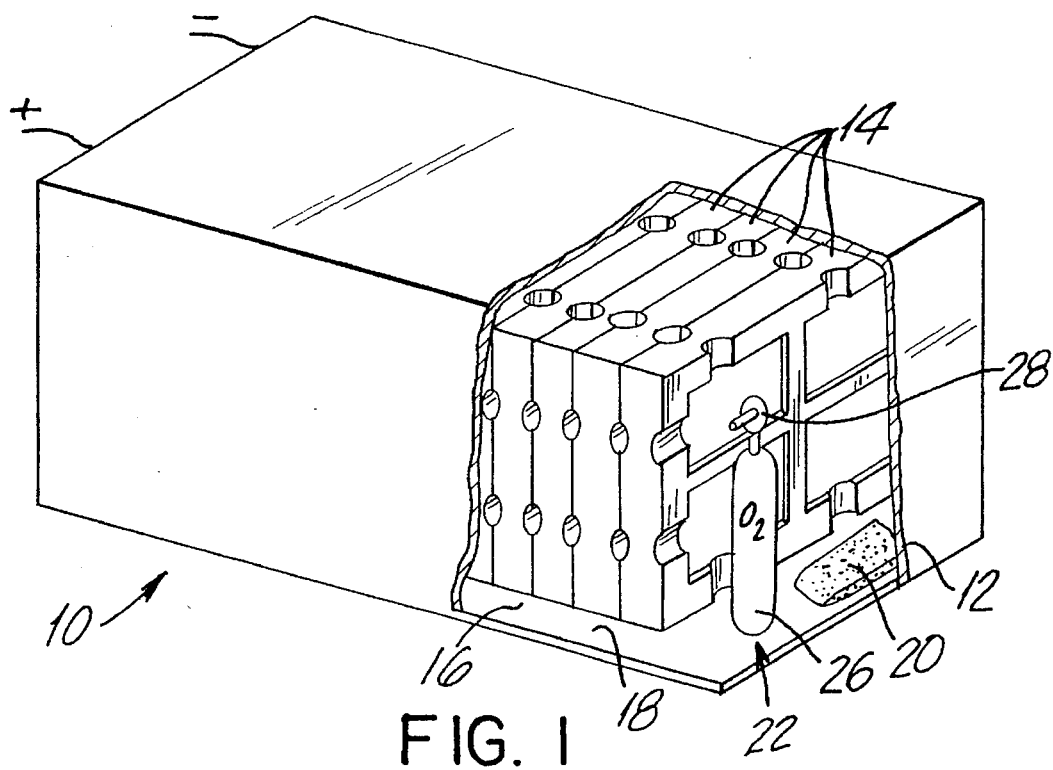
FIG. 1 is a fragmented perspective view of a preferred embodiment of the battery according to the invention.

FIG. 1 depicts a multi-cell, sealed, zinc-oxygen battery 10 in non-detailed form. Its main component is a container 12 holding a plurality of bi-cells 14.

Figure 2:
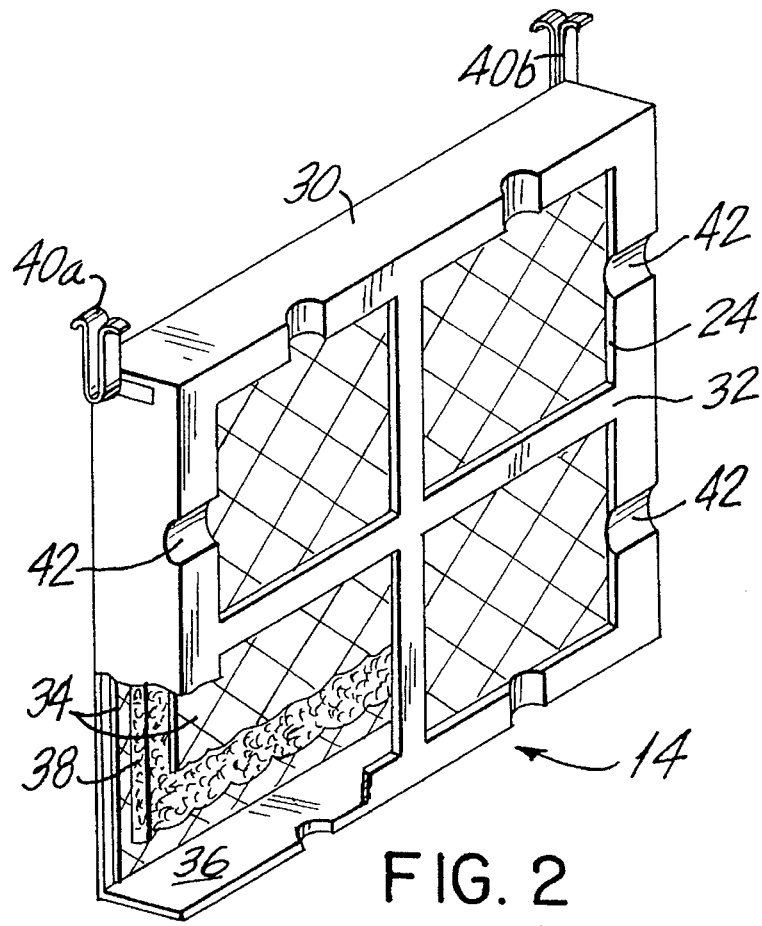
FIG. 2 is a fragmented perspective view of one of the cells contained in said battery.

Each cell 14, one of which is shown in FIG. 2, is contained in a housing 16, suitably made of a chemically-resistant plastic such as polypropylene. The light weight of this plastic is an important advantage for batteries used in vehicles. Housing 16 has two major surfaces 18, accommodating a pair of oppositely-disposed, spaced-apart, air-permeable, liquid-impermeable cathodes in the form of oxygen-reduction electrodes 20.

As seen in FIG. 2, the two electrodes 20 define between themselves a cavity 24, which is configured to accommodate an anode 26 covered with at least one layer of separator (not shown) and electrolyte 28. Substantial portions of the major surfaces 18 are removed, thus exposing major portions of electrodes 20 and so allowing oxygen to reach and to react with the electrodes. The two major surfaces 18 are partly recessed, forming an inter-cathode gas space 29 between adjacent cells 14, with a plurality of oxygen access openings 30 leading thereto.

Anode 26 is positioned within cavity 24, and comprises an active zinc anode component compacted into a rigid static bed 32 of active anode material having tight interparticulate structure. Anode 26 is provided with an internal fluid-carrying passage 34 having inlet and outlet means 36, 38 for circulating cooling fluid 40 therethrough. Manifold tubes 36a, 38a connect all the inlet means 36 and outlet means 38, respectively; together with a heat radiator (not shown), they complete the cooling circuit.

Referring again to FIG. 1, a dead space volume 42 remains between the inner surfaces of container 12 and the plurality of bi-cells 14. Advantageously, volume 42 contains at least one solid, fluid-absorbent material 44. Suitable materials are, e.g., activated carbon, silica gel, activated alumina, or Fuller's earth. Especially preferred is the 3M™ Brand universal absorbent, made of melt-blown polypropylene microfibers, which can hold up to ten times its own weight of water. During operation of the battery, unwanted water vapour or droplets are generated, and material 44 absorbs them.

Also provided in container 12 is a pressurized oxygen supply means 46 for feeding oxygen to the dead space volume 42, to be consumed in the inter-cathode gas spaces formed between the bi-cells shown in FIG. 2. The oxygen enters openings 30 and is used for electrochemical operation of the bi-cells 14. Cell terminals 48, 50 allow power collection. All cell anodes 26 are connected by cooling circuit manifolds 36a, 38a.

Figure 3:
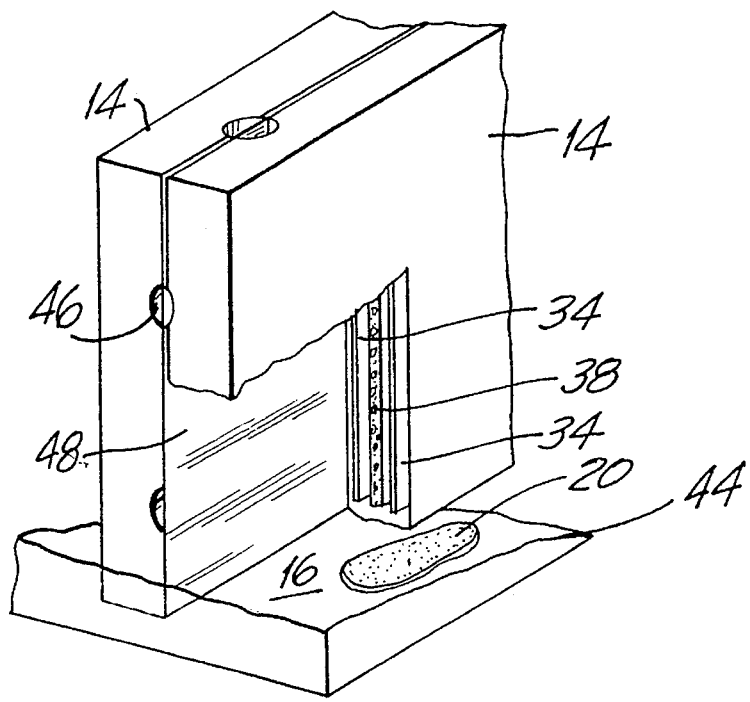
FIG. 3 is a fragmented perspective view of an anode held in said cell.

With reference now to FIG. 3, there is shown an anode 52, similar to anode 26, comprising a substantially planar skeletal frame 54 including conductive metal such as, e.g., silver-, indium- or nickel-plated copper. A portion of a frame surface area is formed as open spaces 56. An active zinc anode component is compacted into a rigid static bed 58 of active anode material having tight interparticulate structure, and encompasses the skeletal frame 54. Spaces 56 foster the adherence of the rigid bed 58 on both sides of the skeletal frame 54, thus forming a unitary plate. Anode 52 is provided with an internal, fluid-carrying passage 64, for passage therethrough of a cooling fluid 40.

The active anode component is formed of a slurry of granules comprising dendritic zinc having an initial density of between 0.2 and 2.0 gr/cc. The dendritic zinc is impregnated with, and suspended in, an electrolyte 60 and compacted under pressure to itself and to the skeletal frame 54, to form a porous, active zinc anode element 62 having a density in the range of 0.5–3.0 gr/cc. Electrolyte 60 consists of an aqueous solution of hydroxide of a Group Ia metal, typically potassium or sodium.

Figure 4:
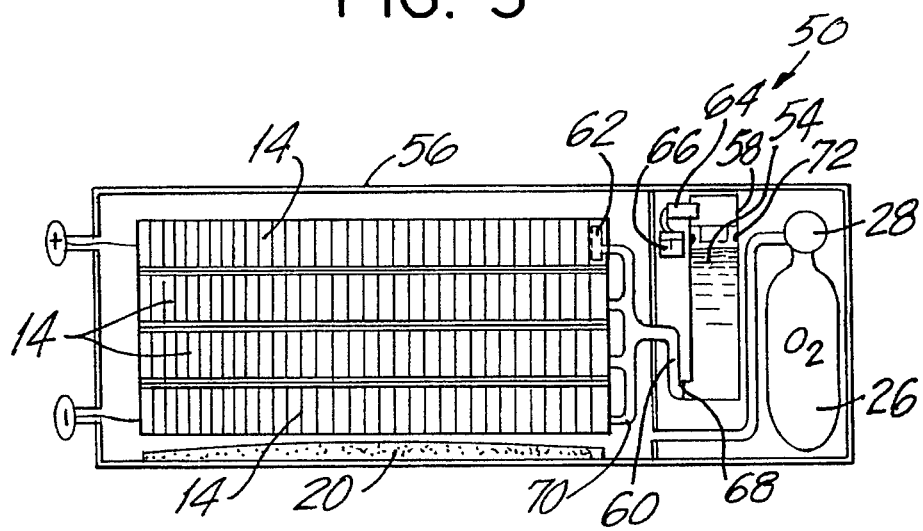
FIG. 4 is a front elevational view of an anode provided with a meandering cooling tube.

A further embodiment of a battery anode 66 is illustrated in FIG. 4. The skeletal frame is composed of a meandering tube 68, which forms the fluid-carrying passage 70. Passage 70 is formed ore an electrically non-conductive material, such as a plastic., Due to the long length of the tube 68 and its thin wall (under 1 mm), heat conduction through the tube wall is sufficient to provide cooling. The current collector joined thereto is contacted by a metal terminal (not shown) and is used in this embodiment to collect power from an oxygen-reducing electrode 20, seen in FIG. 2. The cooling fluid 40 used in this embodiment is advantageously a non-electrically conductive fluid, e.g., a halogenated hydrocarbon such as Dowtherm E ($C_6H_4Cl_2$), freezing point −19° C., or for storage at even lower temperatures, a silicon oil such as Hydrotherm 700–160, freezing point −40° C.

Figure 5:
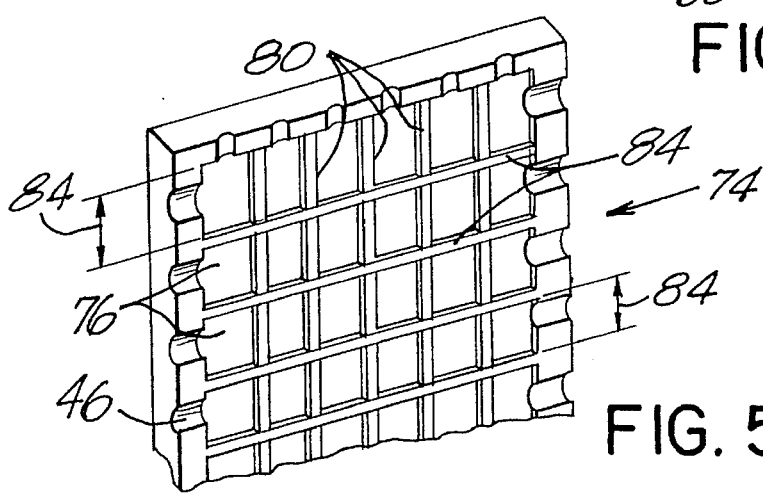
FIG. 5 is a fragmented perspective view of a pair of battery cells separated by plastic partitions.

With reference now to FIG. 5, there is seen a pair of battery cells 14, wherein the space between adjacent cells is subdivided by a plastic partition 72. Suitable partitions 72 are made of plastic film having a thickness between 0.01–0.10 mm. At least the surfaces of partitions 72 are hydrophobic. Suitable materials for the film, or, at least, for its surface coating, are polysulfone, silicones or fluoropolymers. These surfaces, which may be advantageously ribbed, enhance droplet run-off away from the intercathode space and into the dead space volume 42. During operation of the battery 10, unwanted water vapour or droplets are generated, and partition 72 encourages run-off into volume 42, for absorption by material 44.

Figure 6:
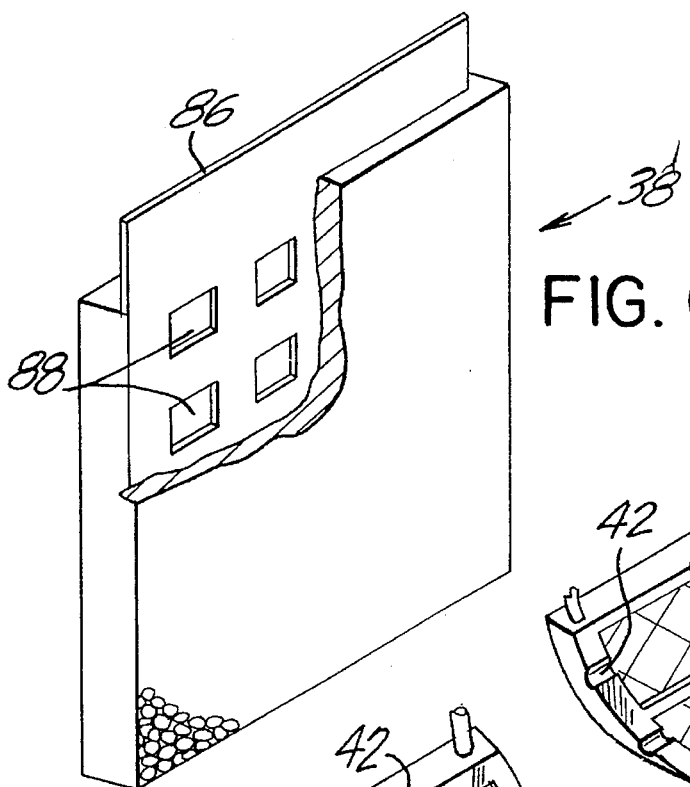
FIG. 6 is a schematic view of a battery of the deferred-action type.

FIG. 6 depicts a multi-cell, cooled, sealed zinc-oxygen battery 74, which is of the deferred-action type. The battery container 76, in addition to the bi-cells 14 described hereinabove with reference to FIGS. 1 and 2, further comprises an electrolyte storage vessel 78 and an openable liquid flow path 80 leading from the cell cavities 24, as shown in FIG. 1, for activation of the battery 74.

Suitably, the pressurized oxygen supply means 46 includes a cylinder 82 of liquid or pressurized oxygen, and a supply valve 84. In the embodiment shown in FIG. 6, a gas-generating cartridge 85 is in fluid communication with vessel 78 and is electrically fireable by a timer 86 or a remote control device (not shown). When fired, the resultant high pressure inside the vessel 78 causes electrolyte 28 to burst a rupture diaphragm 88 positioned in the flow path 80. Further expansion of the generated gas drives the electrolyte 28 along the flow path 80, through manifold 90 and into each of the multi-cell cavities 24 (shown in FIG. 1).

With the approximately simultaneous release of pressurized oxygen, the battery 74 proceeds to generate power within a few seconds of receiving its actuation signal.

In the embodiment of FIG. 6, a floating piston 92 separates the gas generated by the cartridge 85 from the electrolyte 28, and prevents said gas from either entering the electrolyte 28 or from leaving the vessel 78.

Figure 7A:
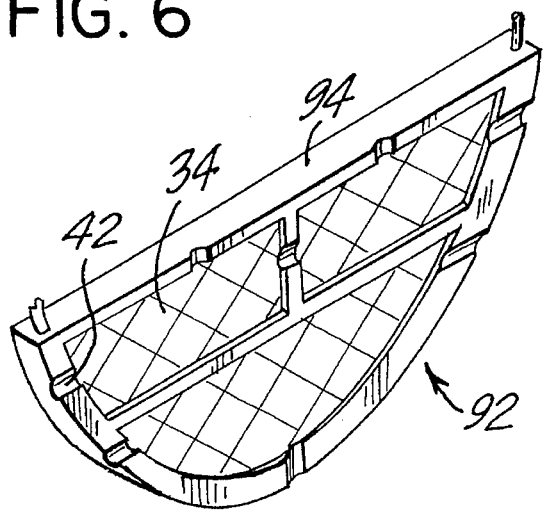
FIG. 7 is a detailed view of ribbing used to support the cathodes.
Figure 7B:
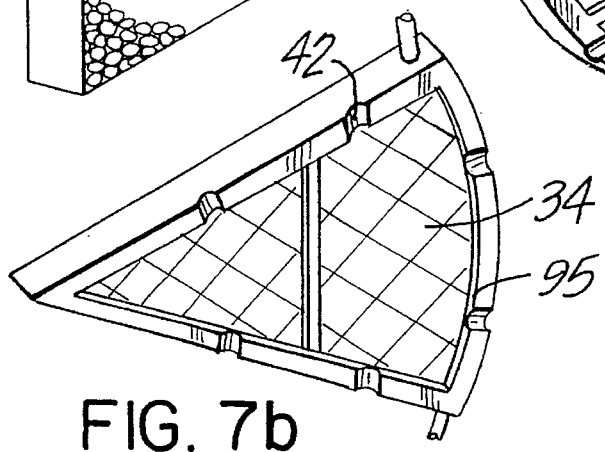

FIG. 7 illustrates a detail of a battery cell housing 94, generally similar to cell housing 16. Exposed portions of the oxygen-reduction electrode 20 are supported and reinforced by ribbing 96. Ribbing 96 is partially constituted of a plurality of slender rails 98, which define ducts 100 for guiding a flow of oxygen across said exposed portions of oxygen-reducing electrodes 20. Further electrode support is provided by slender connectors 102, which are oriented at about 70° to the rails 98.

Figure 8:
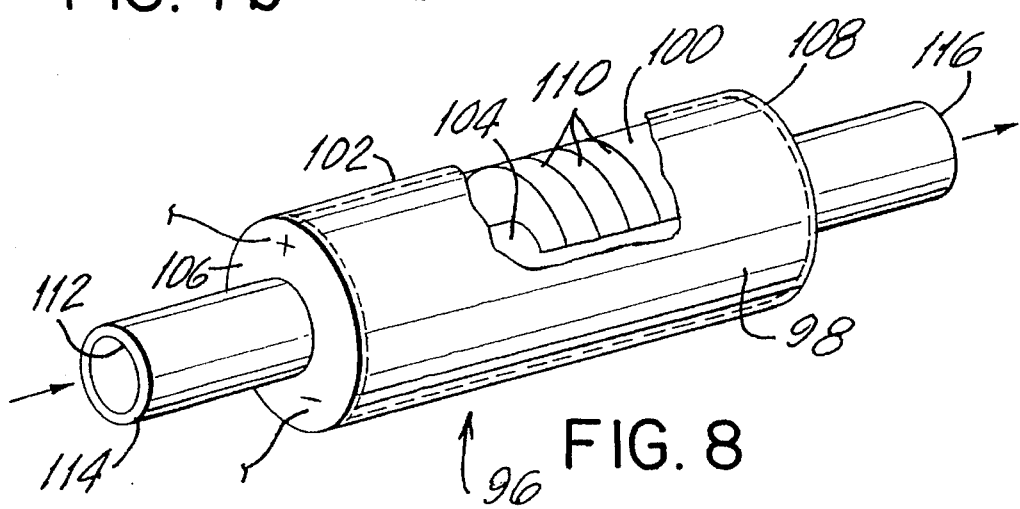
FIG. 8 is a fragmented perspective view of a torpedo powered by a cooled battery of the present invention.

Referring now to FIG. 8, there is shown in non-detailed form a multi-cell, sealed, cooled, zinc-oxygen battery 104 in combination with a torpedo 106. During operation of battery 104, the cooling fluid 40 is circulated by pump means 108 in a heat exchange circuit 109 with a body of water in which torpedo 106 is propelled, via an outer casing 110 of said torpedo. Thus, cooling is effected of the cooling fluid 40, which circulates in a path including the anode internal fluid-carrying passage 70, seen in FIG. 4.

Figure 9:
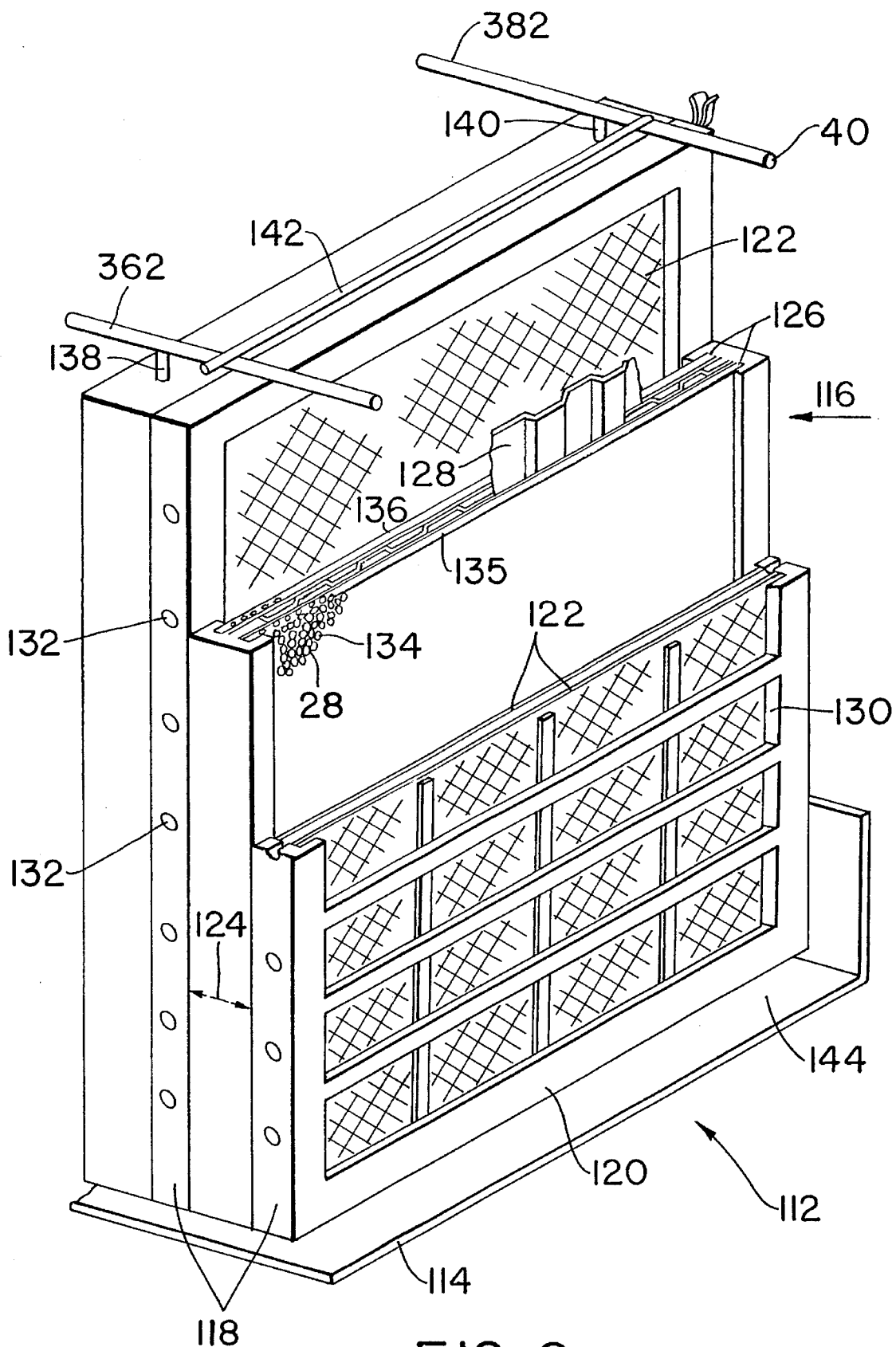
FIG. 9 is a fragmented perspective view of a battery composed of mono cells.

Seen in FIG. 9 is a detail of a multi-cell, sealed, cooled, zinc-oxygen battery 112, comprising a container 114 holding a plurality of adjacent pairs of mono cells 116.

Each pair of mono cells 116 forms a unit contained in a housing 118, provided with two major surfaces 120. Housing 118 accommodates a pair of oppositely-disposed, spaced-apart, air-permeable, liquid-impermeable cathodes in the form of oxygen-reduction electrodes 122. Electrodes 122 define between themselves a cavity 124, configured to accommodate two anodes 126 which are separated from each other by a cooling conduit 128. Substantial portions of the major surfaces 120 of housing 118 are removed, thus exposing major portions of the oxygen-reduction electrodes 122. The two major surfaces 120 are partly recessed to form an inter-cathode gas space 130 between adjacent cells 116, with a plurality of oxygen access openings 132 leading thereto.

Each anode 126 comprises an active zinc anode component, compacted into a rigid static bed 134 of active anode material of tight interparticulate structure. Preferably, the active anode component is formed of a slurry of granules comprising dendritic zinc, having an initial density of between 0.2 and 2.0 gr/cc, said dendritic zinc being impregnated with and suspended in an electrolyte and compacted under pressure to itself and to a skeletal frame 135, to form a porous active zinc anode element having a density in the range of 0.5–3.0 gr/cc. The anode 126 is advantageously covered with a separator layer (not shown).

Electrolyte 28 consists of an aqueous solution of a hydroxide of a Group Ia metal, for example, potassium hydroxide.

The cooling conduit 128 is provided with at least one fluid-carrying passage 136 having inlet 138 and outlet 140, for circulating cooling fluid 40 between adjacent anodes 126. The fluid-carrying cooling conduit 128 is defined by at least a pair of spaced-apart, fluid-impermeable surfaces. In the embodiment shown, the surfaces are formed of a conductive corrugated metal and function as current collectors from the anodes 1.26 to the terminal bar 142.

For a better understanding of the embodiment of FIG. 9, it is to be noted that alternating mono cells 116 are deployed in opposing directions. Thus, each pair of cells can be considered to face each other across a cooling volume, as seen in passage 136.

A dead space volume 144 is provided between the inner surfaces of container 114 and the mono cells 116. This volume 144 serves to collect unwanted water chemically generated by battery operation. Battery 112 is provided with pressurized oxygen supply means 46, for feeding oxygen to the dead space volume 144 to be consumed in the inter-cathode gas spaces 130, as described hereinabove with reference to FIG. 6.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A multi-cell, sealed, cooled, zinc-oxygen battery, comprising a container containing:
   a) a plurality of bi-cells, each cell having a housing provided with two major surfaces and accommodating a pair of oppositely-disposed, spaced-apart, air-permeable, liquid-impermeable cathodes in the form of oxygen-reduction electrodes, and defining between themselves a cavity configured to accommodate an anode of said battery and electrolyte, substantial portions of the major surfaces of said housing being removed, thus exposing major portions of said oxygen-reduction electrodes, and wherein two major surfaces are partly recessed in such a way as to form, in conjunction with a similarly-recessed outer surface of a major wall of an adjacent cell housing, an inter-cathode gas space between adjacent cells with a plurality of oxygen access openings leading thereto;
   b) an anode positioned within said cavity and comprising an active zinc anode component compacted into a rigid static bed of active anode material of tight interparticulate structure, said anode being provided with at least one internal fluid-carrying passage with inlet and outlet means, for circulating cooling fluid therethrough;
   c) a dead space volume between inner surfaces of said housing and said plurality of bi-cells; and
   d) pressurized oxygen supply means for feeding oxygen to said dead space volume, for consumption in said inter-cathode gas spaces.

2. A multi-cell, sealed, cooled, zinc-oxygen battery according to claim 1, wherein said anode comprises a substantially planar skeletal frame including conductive metal and having a portion of a surface area thereof formed as open spaces, and further comprising an active zinc anode component compacted into a rigid static bed of active anode material of tight interparticulate structure encompassing said skeletal frame, said active anode component being formed of a slurry of granules comprising dendritic zinc having an initial density of between 0.2 and 2.0 gr/cc, said dendritic zinc being impregnated with and suspended in an electrolyte and compacted under pressure to itself and to said skeletal frame, to form a porous active zinc anode element having a density in the range of 0.5–3.0 gr/cc, said electrolyte consisting of an aqueous solution of a hydroxide of a Group Ia metal, and said spaces in said skeletal frame fostering the adherence of the rigid bed on both sides of said skeletal frame, thus forming a unitary plate, said anode being also provided with at least one internal fluid-carrying passage with inlet and outlet means, for circulating cooling fluid therethrough.

3. A multi-cell, sealed, cooled, zinc-oxygen battery according to claim 2, wherein said skeletal frame includes a meandering hollow tube forming said fluid-carrying passage.

4. A multi-cell, sealed, cooled, zinc-oxygen battery according to claim 1, wherein said fluid-carrying passage is formed of an electrically conductive metal.

5. A multi-cell, sealed, cooled, zinc-oxygen battery according to claim 1, wherein said cooling fluid is a non-electrically conductive fluid.

6. A multi-cell, sealed, cooled, zinc-oxygen battery according to claim 5, wherein said cooling fluid is selected from the group consisting of halogenated hydrocarbons and silicon oil.

7. A multi-cell, sealed, cooled, zinc-oxygen battery according to claim 1, wherein said space between adjacent cells is subdivided by plastic partitions.

8. A multi-cell, sealed, cooled, zinc-oxygen battery according to claim 7, wherein at least the surfaces of said partitions are hydrophobic.

9. A multi-cell, sealed, cooled, zinc-oxygen battery according to claim 1, wherein said dead space volume contains at least one solid, fluid-absorbent material.

10. A multi-cell, sealed, cooled, zinc-oxygen battery according to claim 1, wherein said battery is a deferred-action battery and said container further comprises an electrolyte-storage vessel and an openable liquid flow path leading from said vessel to said cavity, for activation of said battery.

11. A multi-cell, sealed, cooled, zinc-oxygen battery according to claim 1, wherein said pressurized oxygen supply means includes a cylinder of liquid or pressurized oxygen and a supply valve.

12. A multi-cell, sealed, cooled, zinc-oxygen battery according to claim 1, wherein said exposed portions of said oxygen-reduction electrodes are supported and reinforced by ribbing constituted at least in part by a plurality of slender rails, which rails define ducts for guiding a flow of oxygen across said exposed portions of said oxygen-reduction electrodes.

13. A multi-cell, sealed, cooled, zinc-oxygen battery according to claim 1, in combination with a torpedo and wherein, during operation of said battery, said cooling fluid is circulated via pump means, in heat exchange with a body of water in which said torpedo is propelled, via an outer casing of said torpedo, to effect cooling of said cooling fluid circulating in a path including said anode internal fluid-carrying passage.

14. A multi-cell, sealed, cooled, zinc-oxygen battery, comprising a container containing:
   a) a plurality of adjacent pairs of mono cells, each pair of mono cells forming a unit contained in a housing provided with two major surfaces and accommodating a pair of oppositely-disposed, spaced-apart, air-permeable, liquid-impermeable cathodes in the form of oxygen-reduction electrodes, and defining between themselves a cavity configured to accommodate two anodes separated from each other by a cooling conduit, substantial portions of the major surfaces of said housing being removed, thus exposing major portions of said oxygen electrodes, and wherein two major surfaces are partly recessed in such a way as to form an inter-cathode gas space between adjacent cells with a plurality of oxygen access openings leading thereto;
   b) two anodes positioned within said cavity and separated from each other by said cooling conduit, each of said anodes comprising an active zinc anode component compacted into a rigid static bed of active anode material of tight interparticulate structure, said conduit being provided with at least one fluid-carrying passage with inlet and outlet means, for circulating cooling fluid between said adjacent anodes;
   c) a dead space volume between inner surfaces of said container and said plurality of mono cells; and
   d) pressurized oxygen supply means for feeding oxygen to said dead space volume, for consumption in said inter-cathode gas spaces.

15. A multi-cell, sealed, cooled, zinc-oxygen battery according to claim 14, wherein said active anode component is formed of a slurry of granules comprising dendritic zinc having an initial density of between 0.2 and 2.0 gr/cc, said dendritic zinc being impregnated with and suspended in an electrolyte and compacted under pressure to itself and to said skeletal frame, to form a porous active zinc anode element having a density in the range of 0.5–3.0 gr/cc, said electrolyte consisting of an aqueous solution of a hydroxide of a Group Ia metal.

16. A multi-cell, sealed, cooled, zinc-oxygen battery according to claim 14, wherein said fluid-carrying conduit is defined by at least a pair of spaced-apart, fluid-impermeable surfaces.

17. A multi-cell, sealed, cooled, zinc-oxygen battery according to claim 16, wherein said surfaces are formed of a conductive metal and function as current collectors for the anodes to which they are attached.

* * * * *